United States Patent [19]

Klören

[11] 4,010,669
[45] Mar. 8, 1977

[54] BOLT TENSIONING ARRANGEMENT

[75] Inventor: Ulrich Klören, Krefeld, Germany

[73] Assignee: Ringfeder GmbH, Krefeld-Uerdingen, Germany

[22] Filed: Dec. 17, 1975

[21] Appl. No.: 641,702

[30] Foreign Application Priority Data

Dec. 21, 1974 Germany ............................ 2460961

[52] U.S. Cl. ............................. 85/1 T; 85/50 AT
[51] Int. Cl.[2] ........................................ F16B 35/00
[58] Field of Search .............. 85/1 T, 32 T, 50 A, 85/50 C, 79, 69; 151/14 R; 29/446, 452

[56] References Cited

UNITED STATES PATENTS

| 846,440 | 3/1907 | Adams | 85/50 A X |
|---|---|---|---|
| 2,228,005 | 1/1941 | Giles | 85/50 A X |
| 3,009,747 | 11/1961 | Pitzer | 85/69 X |
| 3,285,568 | 11/1966 | Biach | 85/50 A X |

*Primary Examiner*—Ramon S. Britts
*Attorney, Agent, or Firm*—Michael J. Striker

[57] ABSTRACT

An arrangement for stressing a bolt by applying an axial force which acts between an element from which a portion of the bolt extends and a nut element threaded onto this portion, comprising a first and a second ring adapted to surround the portion axially spaced from one another; first means for moving the rings relative to one another in direction axially of the portion; and second means for applying to one of the elements a stressing force which acts axially upon the portion and stresses the bolt.

15 Claims, 4 Drawing Figures

BOLT TENSIONING ARRANGEMENT

BACKGROUND OF THE INVENTION

This invention relates to a bolt-tensioning arrangement.

When screw bolts are passed through two or more components to be connected, so that the bolt head is located at one side and the nut is located at the other side of the connected components, it is often desired or necessary to tension the bolt and to secure the nut against undesired loosening, e.g., due to vibrations. For this purpose, spring washers, dished springs, toothed washers and similar arrangements are utilized.

All of these prior-art arrangements have in common that the desired degree of bolt-tensioning force must be produced by applying torque to the nut. This necessitates the use of torque wrenches which must often be of great length, or of special force-multiplying wrenches. The torque wrenches are, however, often not usable because of limited space availability which prevents them from being operated, whereas the specialty wrenches are expensive and not available at many work sites.

SUMMARY OF THE INVENTION

It is the general object of this invention to overcome the prior-art disadvantages.

More particularly, it is an object of the invention to provide an improved bolt-tensioning arrangement which permits the tensioning of even large-dimensioned bolts and under conditions of limited working-space availability.

A further object of the invention is to provide such an arrangement which does not require the use of torque wrenches or specialty wrenches for its use.

Still an additional object is to provide such an arrangement which is simple in construction and use, and is therefore inexpensive to construct and to employ.

In pursuance of these and other objects, one feature of the invention resides in an arrangement of the type under discussion which, briefly stated, comprises a first and a second ring adapted to surround said portion axially spaced from one another; first means for moving said rings relative to one another in direction axially of said portion; and second means for applying to one of said elements a stressing force which acts axially upon said portion and stresses said bolt.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
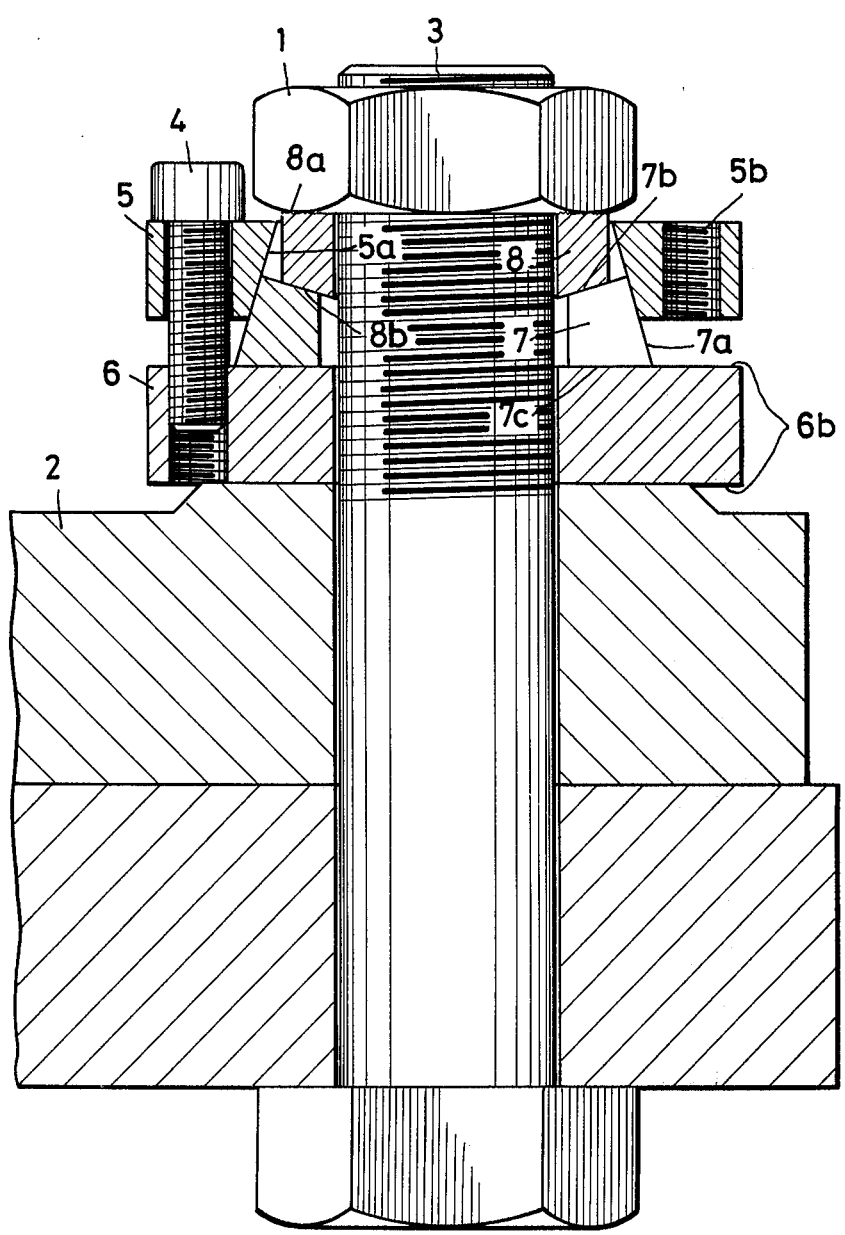
FIG. 1 is an axial section illustrating one embodiment of the invention.

FIG. 1 shows one embodiment of the novel arrangement in unstressed condition and surrounding the bolt 3. This embodiment has a ring 6 with a cylindrical inner circumference, and two parallel, planar end faces 6b. One of these endfaces 6b abuts against one of the elements 2 which are connected by the screw bolt 3 extending through them and having its head located at one side of the elements 2 and its nut 1 at the other side. The other endface 6b cooperates with a planar endface 7c of a slotted ring 7 having a cylindrical inner circumference. The other endface 7b of ring 7, as well as its outer circumference, both taper conically, as shown.

A ring 5 has an inner conical circumference 5a which engages the outer circumference 7a and has a corresponding taper. Ring 5 is also provided with a plurality of circumferentially spaced axial bores. The conical endface 7b cooperates with a matingly conical endface 8b of another ring 8, the other planar endface 8a of which is in surface-to-surface contact with the nut 1.

Screws 4 extend through the bores of ring 5 and are threaded into tapped bores formed in ring 6. When the screws 4 are uniformly tightened (stepwise in circumferential order), the ring 5 is displaced axially and via conical surfaces 5a and 7a this causes the ring 7 (which is provided with at least one axial slot extending from its inner to its outer circumference) to become radially compressed. Correspondingly, via conical surfaces 7b and 8b the ring 8 is pressed against the nut 1, thus exerting an axial tensioning force via the nut 1 upon the bolt 3.

Figure 2:
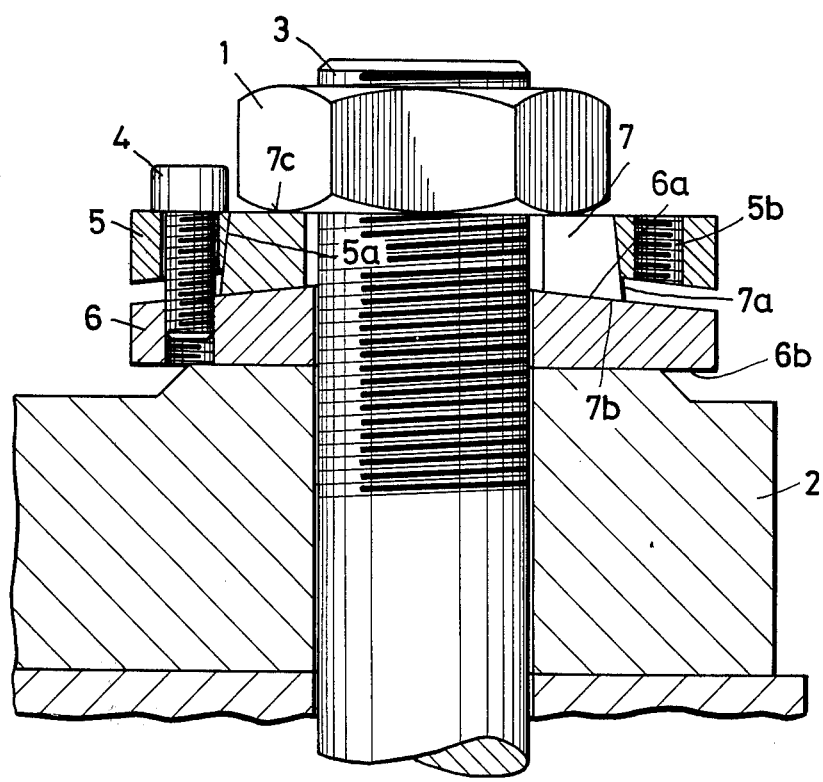
FIG. 2 is a view similar to FIG. 1 but showing another embodiment of the invention.

In the embodiment of FIG. 2 the ring 6 is formed, with a conical endface 6a at its end facing away from the elements 2. The slotted ring 7 engages the end face 6a via its own conical endface 7b. Ring 8 is omitted.

Tightening of screws 4 and axial displacement of ring 5 in this embodiment causes ring 7 to be radially deformed via cooperating endfaces 5a and 7a with the result that its planar endface 7c which abuts the nut 1, exerts axial pressure upon the same and then tensions the bolt 3.

Figure 3:
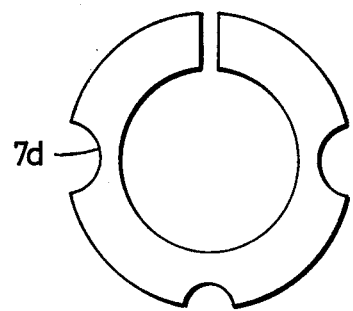
FIG. 3 is a top plan view of a component which is for use with either of the embodiments in FIG. 1 and 2.

FIG. 3 shows that the slotted ring 7 used both in FIG. 1 and in FIG. 2, may be provided in its outer periphery with semi-circular recesses or cut-outs to facilitate the radial deformability of the ring 7.

Figure 4:
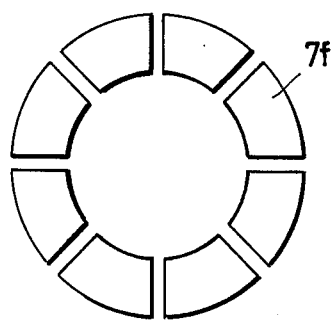
FIG. 4 is a view similar to FIG. 3, showing a different embodiment of the component of FIG. 3.

FIG. 4 shows that according to a further concept of the invention the ring 7 need not be of one piece, but can instead be of a plurality of discrete segments 7f. Its action will still be the same as described before.

Should the rings 5 and 7 seize at their cooperating conical surfaces 5a, 7a, they can be readily disengaged from one another if, as shown in FIGS. 1 and 2, the ring 5 is provided with one or more tapped bores 5b. The screws 4 are then simply disengaged and one of them is threaded into the respective bore 5b until its free end presses against the endface 6a or 6b of the ring 6. Further tightening of this screw then forces the rings 5, 6, 7 apart.

When the ring 8 of the FIG. 1 embodiment bears either upon nut 1 or elements 2, the tensioning force is directly axially transmitted to the bolt 3; no radial force components act upon the endfaces of the ring 8 which engage the nut 1 or the elements 2. If, however, a radial force component is considered acceptable in a particular circumstance, i.e., not disadvantageous in its effects upon the bolt, then the embodiment of FIG. 2 can be used to advantage. This makes for an arrangement that is shorter in axial direction of the bolt than the one in FIG. 1, because the ring 8 is omitted. In fact, according to a further concept of the invention it is also possible to omit the ring 6, if the element 2 facing towards the nut 1 can be provided with tapped bores for the screws 4 and with a conical surface corresponding to the surface 6a in FIG. 2.

The circumferential width of the slot in ring 7 (e.g., the slot shown in FIG. 3 or the total width of the slots or spaces between the segments 7f in FIG. 4), and the inner diameter of the ring 7, are so selected that the ring 7 is free to undergo whatever radial deformation is required to obtain the desired axial tensioning of bolt 3. In other words, the maximum possible radial deformation of ring 7 must not be reached before the desired tensioning is obtained.

Also, given a certain tension force that can be exerted by the screws 4, the cone angles of the internally conical ring of the respective arrangement, of the slotted ring 7 and of the ring 8 (if present) are selected so as to obtain the desired degree of axial tensioning for the bolt 3. The ring into which the screws 4 are threaded, e.g., the ring 6, must of course have a radial thickness permitting the necessary tapped bores to be formed in it, and an axial thickness permitting the screws 4 to be tightened to the extent required to produce the desired axial tensioning of bolt 3.

Ring 5 should advantageously be of high-strength and highly wear-resistant material, e.g., a specialty steel, so that its dimensions can be made relatively small to allow for the limited available space, without sacrificing strength.

The ring 8 or, where the same is not present the ring 7, may be provided at the endface which engages the nut 1 or the element 2 with roughening to obtain better engagement. Such roughening may be in form of teeth, knurling or the like; if applied on ring 7 it must be of such nature (e.g., radial ribs) as not to interfere with the radial compression of ring 7).

The arrangement of the invention permits a precisely defineable axial tension to be applied to bolts of even large diameter, with the aid of screws requiring relatively low torque for their tightening and therefore needing comparatively small tools. Moreover, the tension also acts to retain the nut against undesired loosening. No special requirements as to shape, size or composition need be made of the bolt, the nut or the elements being connected thereby, so that the arrangement is usable in all applications where a tension upon the bolt is required.

It will be understood that each of the elements described above, or two or more together, may also find a useful application in other types of application differing from the types described above.

While the invention has been illustrated and described as embodied in a bolt-tensioning arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for stressing a bolt by applying an axial force which acts between an element from which a portion of the bolt extends and a nut element threaded onto this portion, comprising a first and a second ring adapted to surround said portion axially spaced from one another; first means for applying to said rings an axially acting first force operative for moving said rings relative to one another in direction axially of said portion; and second means for amplifying said first force and for applying to one of said element an axially acting second stressing force which is greater than said first force and acts axially upon said portion and stresses said bolt.

2. An arrangement as defined in claim 1, wherein one of said rings has an axially tapered inner circumferential surface; said second means comprising a slotted additional ring axially abutting the other of said rings and having an outer surface engaging said inner surface and having a complementary taper, said additional ring having a conically tapering endface, and said arrangement having another ring operatively engaging said endface and provided with a planar radial face which engages said one element.

3. An arrangement as defined in claim 1, wherein one of said rings has a conically tapering first endface and the other of said rings has a conically tapering inner circumferential surface; and wherein said second means comprises a slotted additional ring interposed between said one and said other ring and having a conically tapering second endface matingly engaging said first endface and a conically tapering outer circumferential surface matingly engaging said inner circumferential surface.

4. An arrangement as defined in claim 3, said additional ring having another planar endface engaging said one element.

5. An arrangement as defined in claim 1, wherein said second means comprises a slotted additional ring which engages and cooperates with said first and second rings, respectively.

6. An arrangement as defined in claim 5, wherein said additional ring has an outer periphery provided with at least one semi-circular radial recess.

7. An arrangement as defined in claim 5, wherein said additional ring is composed of a plurality of discrete segments.

8. An arrangement as defined in claim 5, said additional ring having at least one axial slot, the width of said slot in circumferential direction of said additional ring and the inner diameter of said additional ring being selected to permit free radial deformation of said additional ring in response to operation of said first means.

9. An arrangement as defined in claim 2, wherein the cone angles of inner and outer surfaces and of said endfaces are selected to produce the requisite stressing of said bolt in response to operation of said first means.

10. An arrangement as defined in claim 3, wherein the cone angles of said endfaces and of said inner and outer surfaces are selected to produce the requisite stressing of said bolt in response to operation of said first means.

11. An arrangement as defined in claim 1, said first ring having a conically tapering inner circumferential surface, and said second means comprising a slotted additional ring having a complementarily tapering outer circumferential surface which engages said inner surface; and further comprising means for separating said rings from one another in axial direction of said rings.

12. An arrangement as defined in claim 11, said separating means comprising at least two tapped circumferentially spaced bores formed in said first ring and adapted to receive bolts having front ends adapted to bear upon said second ring.

13. An arrangement as defined in claim 1, wherein said first means comprises screws threaded through one end into the other of said rings.

14. An arrangement as defined in claim 1, said first ring having a conically tapering inner circumferential surface; and said second means comprising a slotted additional ring having a complementarily tapering outer circumferential surface which engages said inner surface, said first ring being of a high-strength material resistant to wear and stresses.

15. An arrangement as defined in claim 2, said another ring being provided with roughened portions on said planar radial face.

* * * * *